No. 777,659. PATENTED DEC. 20, 1904.
J. BRADBURY, J. BRADBURY, Jr., T. BRADBURY & G. E. BRADBURY.
HAND MORTISING MACHINE.
APPLICATION FILED JUNE 12, 1902.
NO MODEL.
2 SHEETS—SHEET 1.

No. 777,659. PATENTED DEC. 20, 1904.
J. BRADBURY, J. BRADBURY, Jr., T. BRADBURY & G. E. BRADBURY.
HAND MORTISING MACHINE.
APPLICATION FILED JUNE 12, 1902.
NO MODEL. 2 SHEETS—SHEET 2.
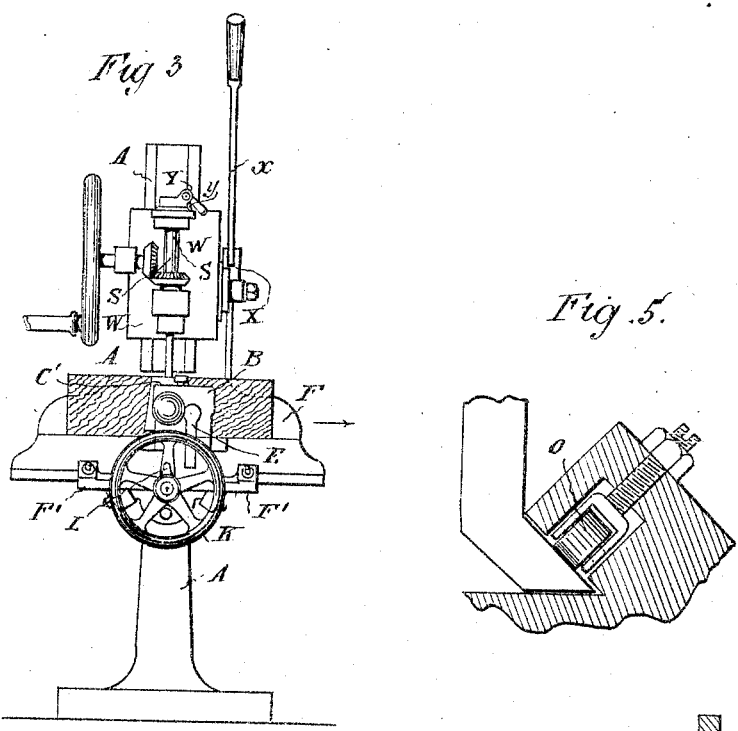
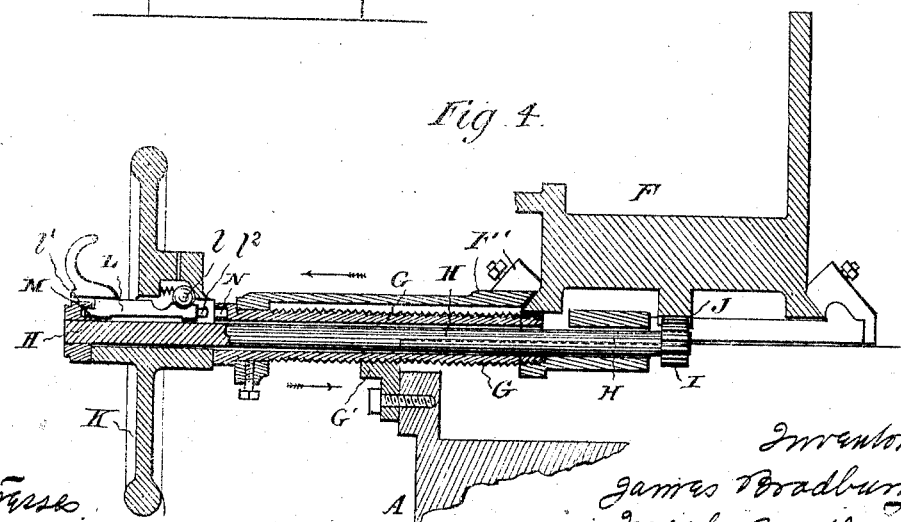

No. 777,659.  Patented December 20, 1904.

UNITED STATES PATENT OFFICE.

JAMES BRADBURY, JOSEPH BRADBURY, JR., THOMAS BRADBURY, AND GEORGE EDWARD BRADBURY, OF CONGLETON, ENGLAND.

HAND MORTISING-MACHINE.

SPECIFICATION forming part of Letters Patent No. 777,659, dated December 20, 1904.

Application filed June 12, 1902. Serial No. 111,347.

*To all whom it may concern:*

Be it known that we, JAMES BRADBURY, of 10 Johnston Square, Congleton, and JOSEPH BRADBURY, the younger, THOMAS BRADBURY, and GEORGE EDWARD BRADBURY, of Throstle Nest House, Congleton, county of Chester, England, engineers, have invented certain new and useful Improvements in Hand Mortising-Machines, of which the following is a specification.

This invention relates to hand mortising-machines, and has for its object to provide a novel means for laterally and longitudinally feeding the wood to be acted upon preparatory to the boring and mortising operation.

In order that our invention may be properly understood and readily carried into effect, we have hereunto appended two sheets of drawings, of which—

Figure 1:
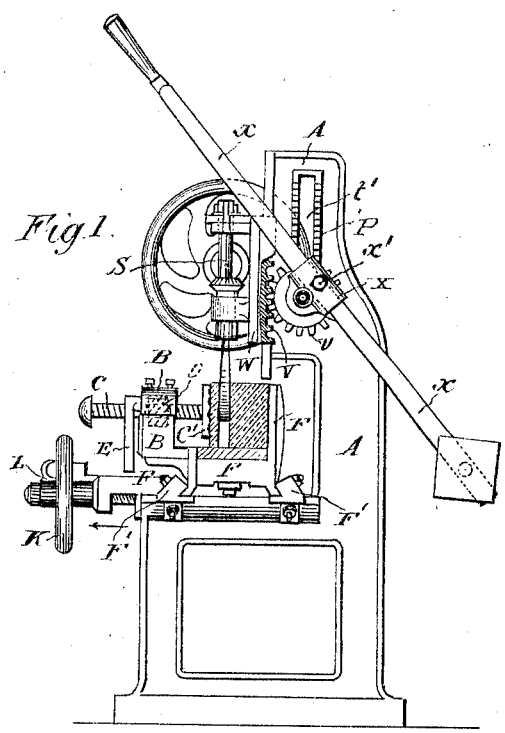
Figure 2:
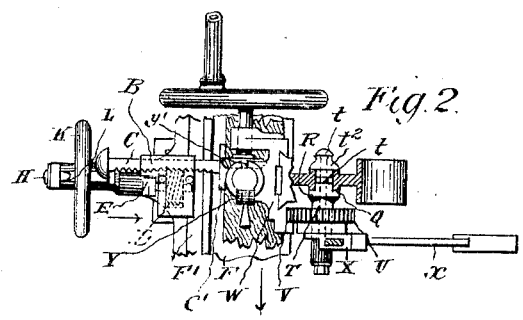

Figure 1 is a side elevation of a complete mortising and boring machine embodying our invention. Fig. 2 is a part plan of the same. Fig. 3 is a front view. Fig. 4 is a longitudinal section, drawn to an enlarged scale, of the transverse table in which the wood to be treated is clamped and unites a backward-and-forward movement and a lateral from-side-to-side movement, as hereinafter more fully explained. Fig. 5 is a part section, also drawn to an enlarged scale, of a roller-bearing for reducing friction of the travel of the table or carriage in the grooves.

Upon the frame A of the machine is mounted to reciprocate forward and backward or longitudinally a lower carriage $F'$. Carried by said carriage $F'$ and revoluble thereon is a hollow screw G, in which works a spindle H, which extends beyond the end of the hollow screw and has loosely mounted thereon a hand-wheel K, adapted to be connected either to the hollow screw S or the spindle H by means of a slide-bar L, which is provided with projections $l'$ and $l^2$ to enter recesses M and N, one in a ring on the spindle and the other in the end of the hollow screw, said slide-bar being held in either position by a spring-pressed ball $l$, carried by the hand-wheel and adapted to enter indentations in said slide-bar. Carried by the lower carriage $F'$ is an upper carriage F, which is adapted for lateral travel upon the said lower carriage $F'$ and is provided with a rack-bar J, with which a pinion I upon the spindle H is adapted to mesh.

Any suitable means may be employed for securing the material to be mortised upon the carriage F; but it is preferred to use a plate C', having a roughened face and to which plate is secured a rack $c$, which works through a bracket B. The rack is moved by a three-toothed worm D, (shown in Figs. 1 and 2 in dotted lines,) operated by a handle E.

The mortising device may be of any approved form; but in the form preferred and herein shown the tool-carriage W is adapted to be raised and lowered by means of a rack V, carried by the carriage, and a pinion U, carried by the frame A and operated by a balanced lever X. The spindle T of the pinion U is adapted to be raised and lowered in the slot $t'$, whereby the machine may be used upon materials of varying thicknesses.

The operation of the invention is as follows: When it is desired to move the carriage F longitudinally, the projection $l^2$ of the slide-bar L is thrown into the notch N of the hollow screw G. The hand-wheel K is then turned, revolving the said screw, which meshes with a section of a nut G', carried by the frame A, and consequently the lower carriage $F'$ is moved. As the upper carriage F is carried by the lower carriage it is moved therewith. When it is desired to move the upper carriage F, the projection $l'$ of the bar L is thrown into the recess M, and the hand-wheel K is turned, whereby the hollow screw G remains stationary, and the spindle H is turned, so that the pinion I on said spindle is rotated, and as this pinion meshes with the rack J on the upper carriage F the said carriage is moved laterally.

Having thus described our invention, the following is what we claim as new therein and desire to secure by Letters Patent:

1. In a machine of the class described, the combination with the lower carriage and the upper carriage carried by the lower carriage, of a hand-wheel, means for moving the lower carriage to move both carriages, means for engaging the upper carriage to move said upper carriage independently of the lower carriage, and means movable to connect the hand-wheel with either of said carriage-operating means.

2. In a machine of the class described, the combination with the lower carriage and the upper carriage carried thereby, of a hollow screw connected with the lower carriage and a spindle extending through the screw and connected with the upper carriage, and means adapted to be connected either with the hollow screw to move both carriages or with the spindle to move the upper carriage.

3. In a machine of the class described, the combination with the lower carriage and the upper carriage carried thereby, of a hollow screw connected with the lower carriage, a spindle extending through the hollow screw and connected with the upper carriage, a hand-wheel mounted on the spindle, and means for connecting the hand-wheel either to the hollow screw or the spindle.

4. In a machine of the class described, the combination with the lower carriage, and the upper carriage carried thereby and provided with a rack, of a hollow screw connected with the lower carriage and provided with a recess, a spindle carrying a pinion on one end to mesh with the rack on the upper carriage, extending through the hollow screw, and provided with a recess, a hand-wheel mounted near one end of the spindle, a slide-bar provided with indentations and constructed to enter the recess of the spindle or the recess of the hollow screw, and a spring-pressed ball carried by the hand-wheel and adapted to enter the indentations of the slide-bar.

In testimony whereof we have affixed our signatures in presence of two witnesses.

JAMES BRADBURY.
JOSEPH BRADBURY, Jur.
THOMAS BRADBURY.
GEORGE EDWARD BRADBURY.

Witnesses:
JOHN LIDDLE,
AGNES MACKINTOSH.